United States Patent Office 3,525,765
Patented Aug. 25, 1970

3,525,765
SUBSTITUTED CARBAMYL AND THIOCARBAMYL METHYL-CHLOROACETAMIDES
Llewellyn W. Fancher, Orinda, and Duane R. Arneklev, Sunnyvale, Calif., assignors to Stauffer Chemical Company, New York, N.Y., a corporation of Delaware
No Drawing. Continuation-in-part of application Ser. No. 443,100, Mar. 26, 1965. This application May 16, 1968, Ser. No. 729,508
Int. Cl. C07c *155/08, 125/06*
U.S. Cl. 260—479      7 Claims

ABSTRACT OF THE DISCLOSURE

This invention pertains to certain substituted carbamyl methyl-chloroacetamides and thiocarbamyl-methyl-chloroacetamides corresponding to the formula

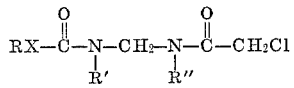

in which X is oxygen or sulfur; R is alkenyl, alkynyl, haloalkyl and nuclearly substituted phenyl in which the substituents are 1 to 5 halogens, especially chlorine; R' is hydrogen, alkyl, phenyl, alkenyl or cyclohexyl; and R" is hydrogen, alkyl or alkenyl. The above compounds are effective herbicides. Representative compounds are: propargyloxy-N-methyl-carbamylmethyl chloroacetamide, allyloxy-N-methylcarbamylmethyl chloroacetamide, β-chloro-ethoxy - carbamylmethylchloroacetamide, 2,4-dichlorophenoxycarbamyl-N-methyl chloroacetamide, and p-chlorophenoxycarbamyl-N-methyl chloroacetamide.

---

This application is a continuation-in-part of copending application Ser. No. 443,100, filed Mar. 26, 1965, now abandoned.

This invention relates to certain new and novel organic compounds which may be used as effective herbicides. More specifically, this invention relates to certain substituted carbamyl methyl-chloroacetamides and thiocarbamylmethylchloroacetamides and to the use of such compounds in herbicidal compositions.

The compounds comprising the instant class correspond to the general formlla

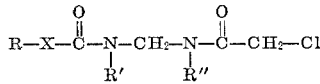

wherein X is selected from the group consisting of oxygen and sulfur, preferably oxygen; R is selected from the group consisting of alkenyl, preferably having 3 or 4 carbon atoms with the double bond at least one carbon atom away from the radical X, alkynyl, preferably having 3 or 4 carbon atoms with the triple bond at least one carbon atom away from the radical X, haloalkyl, preferably chloroalkyl preferably having 1 to 4 carbon atoms, inclusive, and nuclearly substituted phenyl wherein said substituents are from 1 to 5 halogens, inclusive, preferably 1 to 2 chlorines; R' is selected from the group consisting of hydrogen alkyl having 1 to 4 carbon atoms, phenyl, alkenyl, preferably having 3 or 4 carbon atoms with the double bond at least one carbon atom away from the nitrogen group, and cyclohexyl; and R" is selected from the group consisting of hydrogen alkyl having 1 to 4 carbon atoms and alkenyl, preferably having 3 or 4 carbon atoms with the double bond at least one carbon atom away from the nitrogen group.

The compounds herein contemplated can be prepared by several methods. One such general method applied in preparing the compounds was the condensation reaction between the appropriate substituted carbamate or thiocarbamate and the appropriate N-hydroxymethyl chloroacetamide. A stable acid condensation catalyst, such as 2-naphthalene-sulfonic acid monohydrate is added to facilitate the completion of the reaction. The reaction proceeds readily in the liquid phase. The employment of an inert organic solvent is also useful, facilitating processing as well as agitation of the reactants. Temperatures that permit operation in the liquid phase and which are between room temperature and reflux temperature of the solvent, if any is used, are employed. Preferably, the reaction mixture is refluxed, usually at an elevated temperature.

The compounds of the present invention are particularly effective as herbicides. They are effective in the control of grasses and broadleaf plants with both pre-emergence and post-emergence activity.

The compounds of the present invention can be made in accordance with the following examples.

EXAMPLE I

Propargyloxy-N-methyl carbamylmethyl-chloroacetamide

A reaction mixture consisting of 63.9 g. (0.564 M) of propargyl-N-methylcarbamate, 69.5 g. (0.564 M) of N-hydroxymethyl chloroacetamide, 1.0 g. of naphthalene-beta sulfonic acid monohydrate and 150 cc. of benzene is stirred and refluxed in an apparatus equipped for the continuous removal of water until no further water is obtained (approximately 1.5 hrs.). The volume of water collected is 10.8 cc. After cooling to room temperature, a small amount of insoluble solid is filtered off and discarded. The filtrate is evaporated to a constant $n_D^{30}$. The product weighs 115.8 g. (92.5% of theory), $n_D^{30}=1.5011$.

EXAMPLE 2

Allyloxy-N-methylcarbamylmethyl-chloroacetamide

By the same procedure as used in Example 1, 56.6 g. (0.492 M) of allyl-N-methylcarbamate, 61.5 g. (0.492 M) of N-hydroxymethyl chloroacetamide, 1.0 g. of naphthalene-beta-sulfonic acid monohydrate and 150 cc. of benzene yields 9.5 cc. of water and 102.8 g. (94.5% of theory) of product, $n_D^{30}=1.4922$.

The following is a table of the compounds prepared according to the aforedescribed procedures. Compound numbers are assigned to each compound and are then used for identification throughout the balance of the application.

TABLE I

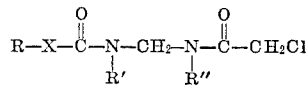

| Compound No. | R | X | R' | R" |
|---|---|---|---|---|
| 1 | 2-propynyl | O | Methyl | H |
| 2 | 2-propenyl | O | do | H |
| 3 | Cl-ethyl | O | do | H |
| 4 | Cl-ethyl | O | H | H |
| 5 | 2-butynyl | O | H | Methyl |
| 6 | 2-butenyl | O | Butyl | H |
| 7 | 2-chloro-butyl | S | Methyl | Methyl |
| 8 | 2-propenyl | S | Phenyl | H |
| 9 | 2-4,-Cl₂-phenyl | O | Methyl | H |
| 10 | 4-Cl-phenyl | O | do | H |
| 11 | Br-methyl | O | Cyclohexyl | Methyl |
| 12 | 4-chloro-phenyl | O | H | Butyl |
| 13 | do | S | H | 2-propenyl |
| 14 | do | S | H | 2-butenyl |
| 15 | do | O | 2-propenyl | Ethyl |
| 16 | 2-chloro-butyl | O | 2-butenyl | H |
| 17 | Pentachlorophenyl | O | H | H |

As previously mentioned, the herein described novel compositions produced in the above-described manner are phytotoxic compounds which are useful and valuable in controlling various plant species.

Pre-emergence herbicide test

The seeds of crab grass, annual bluegrass, watergrass, wild oats, pigweed, mustard and curly dock were planted in individual rows one-half inch deep in Santa Cruz sandy loam soil contained in compressed paper flats 8¼" x 6½" which are 2¾" deep. Enough seeds were planted to give about thirty to fifty plants of each of the weed species in each flat. The flats were watered after planting. The following day, each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

TABLE II

| Compound No. | Pre-emergence activity rate, 20 lbs./a. | | | | | | |
|---|---|---|---|---|---|---|---|
| | Crab grass | Annual bluegrass | Water grass | Wild oat | Pigweed | Mustard | Curly Dock |
| 1 | +++ | +++ | +++ | +++ | ++ | − | ++ |
| 2 | +++ | +++ | +++ | +++ | ++ | − | ++ |
| 3 | +++ | +++ | +++ | +++ | +++ | − | ++ |
| 4 | +++ | +++ | ++ | +++ | +++ | − | + |
| 9 | +++ | +++ | ++ | + | +++ | − | |
| 10 | +++ | +++ | ++ | + | +++ | − | ++ |

+=slight injury, ++=moderate injury, +++=severe injury or death.

Post-emergence herbicide test

The seeds of five weed species, crab grass, watergrass, wild oats, mustard, curly dock, and one crop, pinto beans (*Phaseolus vulgaris*) were planted in individual rows as described in the pre-emergence test, supra. Two weeks after planting, the plant foliage was sprayed with a solution of the test compounds at a rate equivalent to 20.0 pounds/acre. The treated plants were placed back in the greenhouse. Injury ratings were recorded 14 days after treatment. The rating system is the same as that used in the pre-emergence test. Table III lists the results obtained therefrom.

TABLE III

| Compound No. | Post-emergence activity rate, 20 lbs./a. | | | | | |
|---|---|---|---|---|---|---|
| | Crab grass | Water grass | Wild oat | Mustard | Curly Dock | Pinto bean |
| 1 | +++ | +++ | +++ | ++ | +++ | +++ |
| 2 | +++ | ++ | ++ | +++ | +++ | +++ |
| 3 | +++ | +++ | ++ | +++ | +++ | +++ |
| 4 | +++ | +++ | + | +++ | +++ | +++ |
| 9 | ++ | ++ | − | + | − | + |
| 10 | +++ | ++ | ++ | ++ | + | +++ |

On further evaluation of pre-emergence activity, the following compounds produced a 75% or better control of four grasses and at least one broadleaf specie at 2 lbs. per acre: compound numbers 1, 2 and 10.

The compounds of the present invention are used as pre-emergence or post-emergence herbicides and are applied in a variety of ways at various concentrations. In practice, the compounds are formulated with an inert carrier, utilizing methods well known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spraydusters. The compositions can also be applied from airplanes as a dust or a spray because they are effective in very low dosages. In order to modify or control growth of germinating seeds or emerging seedlings, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied on the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Phytotoxicants useful in combination with the above-described compounds include for example 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxy-propylamino)-6-methylthio-S-triazine; 2-chloro-4-ethylamino-6-isopropyl-amino-S-triazine, and 2-ethyl-amino - 4 - isopropylamino - 6-methylmercapto-S-triazine; urea derivatives, such as 3-(3,4-dichlorophenyl)-1,1-dimethyl urea and 3-(p-chlorophenyl)-1,1-dimethyl urea, and acetamides such as N,N-diallyl-α-chloroacetamide, N-(α-chloroacetyl) hexamethylene imine, and N,N-diethyl-α-bromoacetamide, and the like; benzoic acids such as 3-amino-2,5-dichlorobenzoic and; thiocarbamates, such as S-propyl dipropylthiocarbamate; S-ethyl-dipropylcarbamate, S-ethyl-cyclohexylethylthiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow such as compost, manure, humus, sand and the like.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

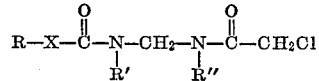

wherein X is selected from the group consisting of oxygen and sulfur, R is selected from the group consisting of alkenyl, having 3 or 4 carbon atoms, alkynyl, having 3 or 4 carbon atoms, haloalkyl, having 1 to 4 carbon atoms, inclusive, and nuclearly substituted phenyl wherein said substituents are from 1 to 5 halogen atoms, inclusive, R' is selected from the group consisting of hydrogen, alkyl having 1 to 4 carbon atoms, phenyl, alkenyl having 3 or 4 carbon atoms, and cyclohexyl and R'' is selected from the group consisting of hydrogen, alkyl having 1 to 4 carbon atoms and alkenyl having 3 or 4 carbon atoms.

2. A compound according to claim 1 in which X is oxygen, R is 2-propynyl, R' is methyl and R'' is hydrogen.

3. A compound according to claim 1 in which X is oxygen, R is 2-propenyl, R' is methyl and R'' is hydrogen.

4. A compound according to claim 1 in which X is oxygen, R is β-chloroethyl, R' is methyl and R'' is hydrogen.

5. A compound according to claim 1 in which X is oxygen, R is β-chloroethyl, R' is hydrogen and R'' is hydrogen.

6. A compound according to claim 1 in which X is oxygen, R is 2,4-dichlorophenyl, R' is methyl and R'' is hydrogen.

7. A compound according to claim 1 in which X is oxygen, R is 4-chlorophenyl, R' is methyl and R'' is hydrogen.

References Cited

FOREIGN PATENTS 632,153  2/1963  Belgium.

JAMES A. PATTEN, Primary Examiner

U.S. Cl. X.R.

71—100, 111, 106; 260—468, 482, 455

PO-1050
(5/69)

UNITED STATES PATENT OFFICE
CERTIFICATE OF CORRECTION

Patent No. 3,525,765      Dated September 15, 1970

Inventor(s) Llewellyn W. Fancher et al.

It is certified that error appears in the above-identified patent and that said Letters Patent are hereby corrected as shown below:

In Line 8 of the Abstract of the Disclosure, after the formula, before $\alpha$-chlo-, the following phrase should be added
---$\alpha$-chloro-ethoxy-N-methyl-carbamylmethyl chloroacetamide---

Column 2, Table I, under Column R, Compound No. 9 should read
---2,4,-$Cl_2$-phenyl---

Column 4, Line 55, should read
---such as S-propyl dipropylthiocarbamate; S-ethyl-dipropylthio---

SIGNED AND
SEALED
NOV 10 1970

(SEAL)
Attest:

Edward M. Fletcher, Jr.
Attesting Officer

WILLIAM E. SCHUYLER, JR.
Commissioner of Patents